Aug. 28, 1951     I. BOTWINICK     2,565,753
METHOD AND APPARATUS FOR FORMING PLASTIC BUTTONHOLES
Filed Jan. 6, 1947     4 Sheets-Sheet 1
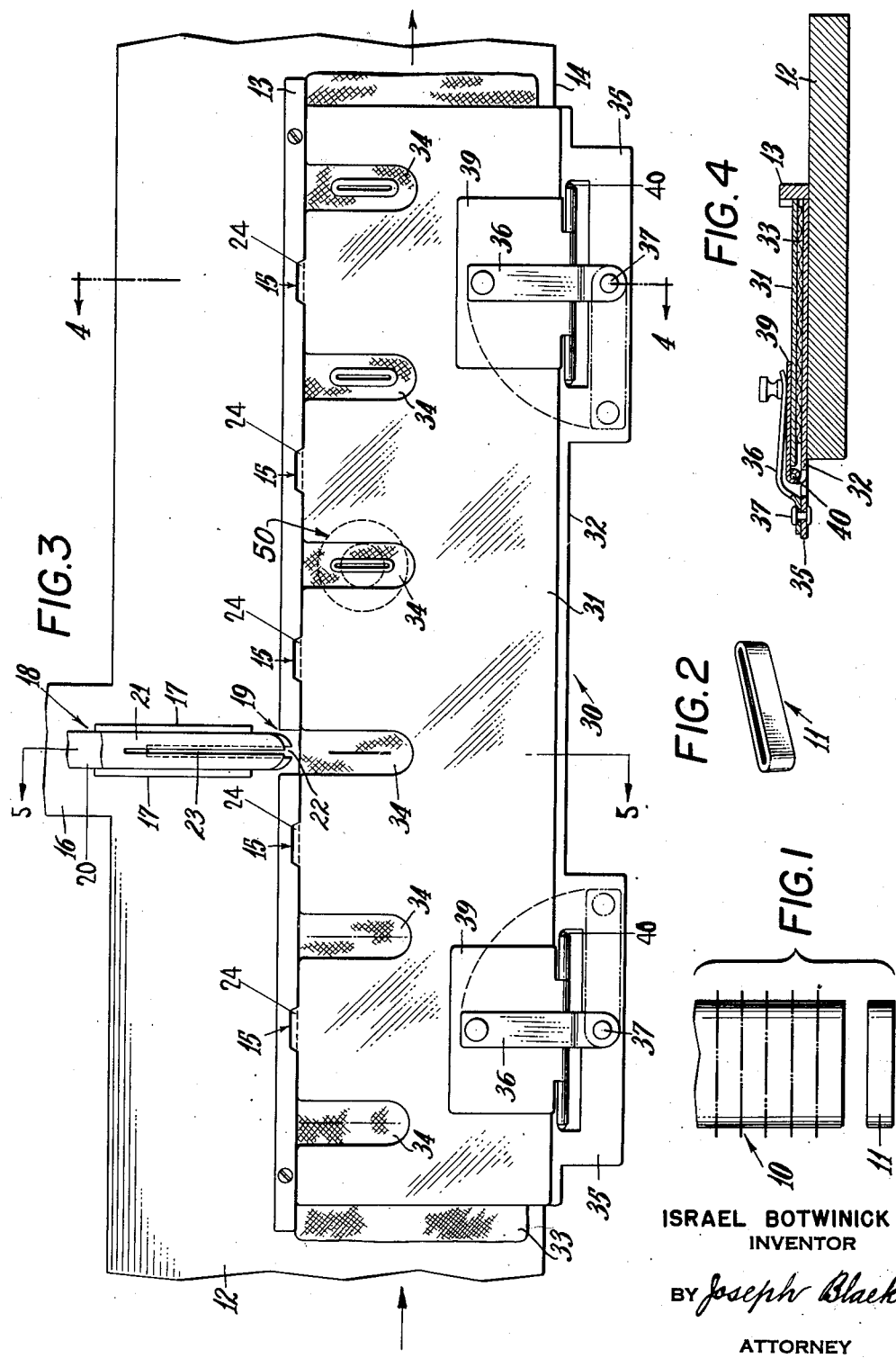
ISRAEL BOTWINICK
INVENTOR
BY Joseph Blacker
ATTORNEY

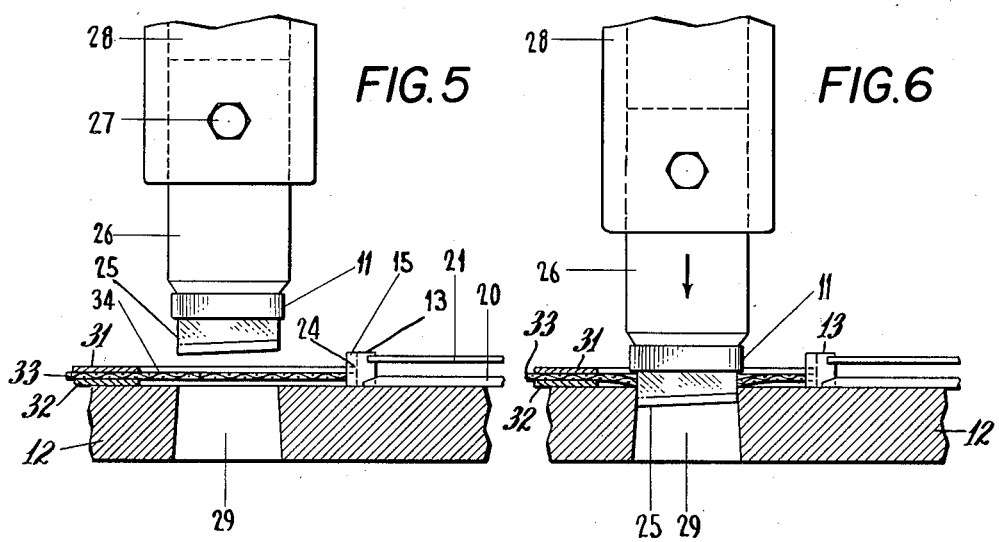
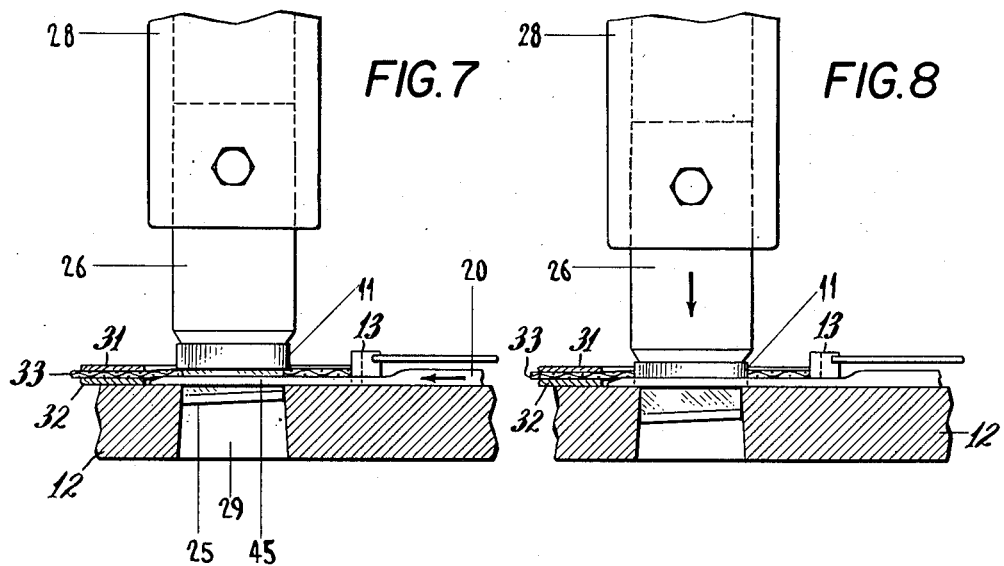

Aug. 28, 1951  I. BOTWINICK  2,565,753
METHOD AND APPARATUS FOR FORMING PLASTIC BUTTONHOLES
Filed Jan. 6, 1947  4 Sheets-Sheet 3
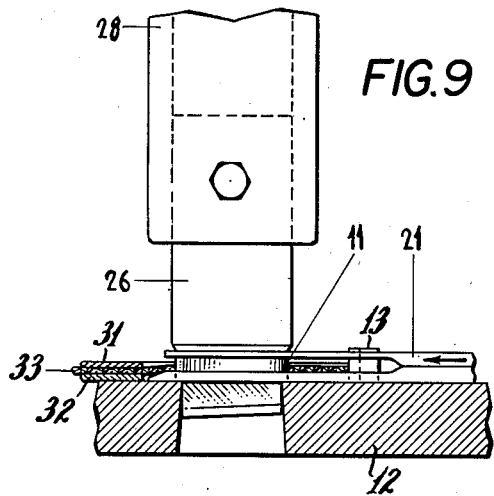
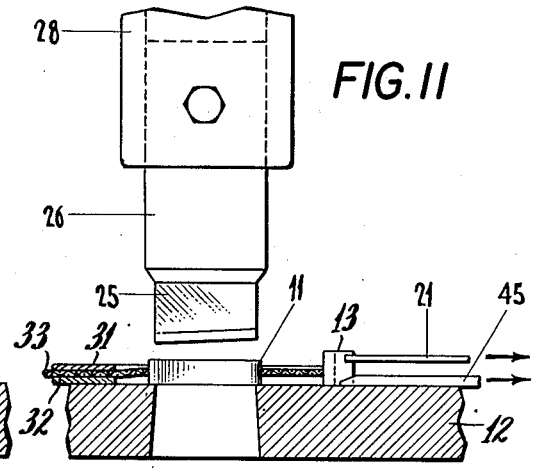
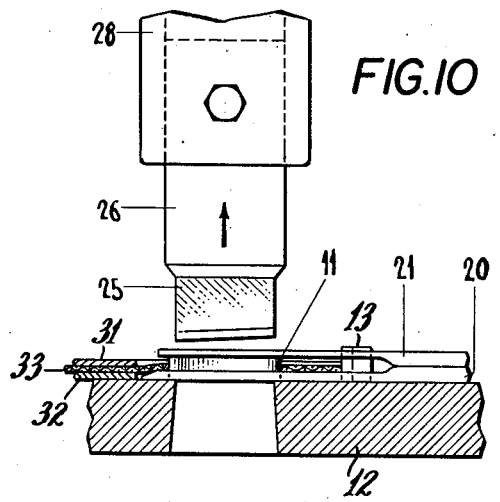
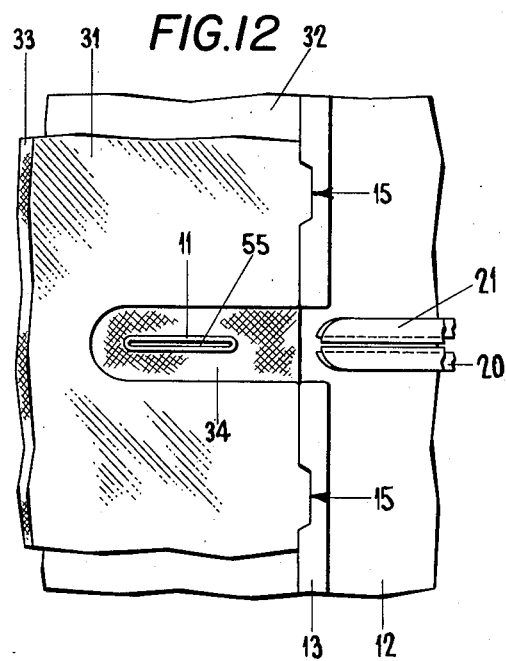
ISRAEL BOTWINICK
INVENTOR
BY Joseph Blacker
ATTORNEY

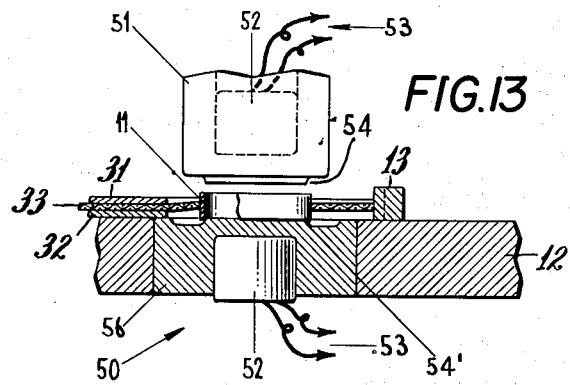
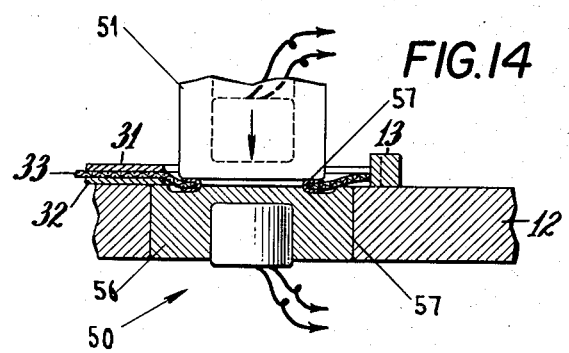
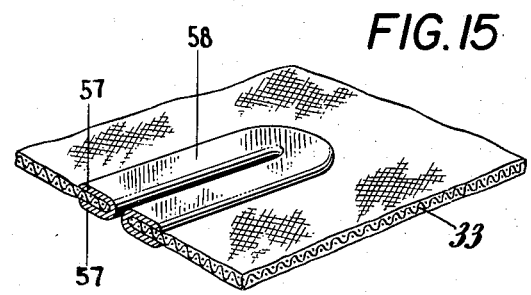

Patented Aug. 28, 1951

2,565,753

UNITED STATES PATENT OFFICE 2,565,753

METHOD AND APPARATUS FOR FORMING PLASTIC BUTTONHOLES

Israel Botwinick, Brooklyn, N. Y.

Application January 6, 1947, Serial No. 720,409

2 Claims. (Cl. 154—1.6)

This invention relates to flexible plastic buttonholes and to a method of producing same.

An object of this invention is to provide a flexible plastic reinforcement for buttonholes adapted to be fabricated from tubular thermoplastic resinous material.

Another object of this invention resides in the arrangement and combination of parts embodied by way of example in the method and apparatus hereinafter described as illustrating the preferred form of the invention.

Another object of this invention resides in the method of fabricating a flexible plastic re-inforcement for apertures made in fabric having interstices, which comprises cutting an aperture in the fabric, placing a section of relatively thin flexible thermoplastic resinous tubing material in the aperture, in causing an equal piece of the plastic tubing to project from the fabric on opposite sides, in forming flanges at the top and bottom of the tubing by upper and lower flanging dies, and in applying heat and pressure to the flanges to cause the plastic material to be impregnated tacky into the interstices in the fabric from opposite sides thereof while the plastic material is tacky.

With the above and other objects in view, the invention will be hereinafter more particularly described, and the combination and arrangement of parts will be shown in the accompanying drawings and pointed out in the claims which form part of this specification.

Reference will now be had to the drawings, wherein like numerals of reference will designate corresponding parts throughout the several views, in which:

Figure 1 is a vertical elevation of a length of tubular material to be cut into sections, one of the sections being shown in cut position.

Figure 2 is a perspective view of one of the tubular sections.

Figure 3 is a top plan view of a fragmentary portion of a cutting, inserting and molding press.

Figure 4 is a cross-sectional view, the section being taken as on line 4—4 in Figure 3.

Figure 5 is a view of a fragmentary portion of the press, showing a cutting member having a section of the tubular plastic material mounted thereon, and showing a section of fabric laid in position for cutting openings for buttonholes therein.

Figure 6 is a view similar to that shown in Figure 5, and showing the cutting member in operative cutting position in the cloth.

Figure 7 is a view similar to Figure 6 and showing a cloth raising member moved horizontally into cloth raising position.

Figure 8 is a view similar to Figure 7 and showing the tubular section inserted into the cloth.

Figure 9 is a view similar to Figure 8 and showing a hold down member moved on top of the tubular section.

Figure 10 is a view similar to Figure 9 and showing the cutting member moved upwardly clear of the tubular section.

Figure 11 is a view similar to Figure 10 and showing the hold down member and the cloth raising member moved away clear of the tubular section.

Figure 12 is a top plan view of a fragmentary portion of the supporting plate of the press with the tubular section ready for molding.

Figure 13 is a view of a fragmentary portion of the molding section of the press and showing the tubular section and the cloth ready for the molding operation.

Figure 14 is a view similar to Figure 13 and showing the molding operation.

Figure 15 is a perspective view of a fragmentary portion of a finished flexible buttonhole in a section of cloth.

In the illustrated embodiment of the invention, the numeral 10 indicates a length of flexible tubular plastic material from which the buttonholes are fabricated, the tubular material being cut into sections, one of the sections 11 being shown in cut form. Figure 2 shows one of the cut tubular sections in perspective and in elongated form simulating a buttonhole.

Figure 3 is a top plan view of a fragmentary portion of a cutting, section inserting, and molding press, comprising an elongated work supporting base 12 having an upright guide wall 13 integral therewith. The wall 13 is positioned in spaced-apart relation with and parallel to the outer edge 14 of the work supporting base 12.

The front face of the wall 13 has a plurality of vertically positioned keyways 15. The keyways 15 are positioned in spaced-apart relation to each other. The distance between the mid-portions of any two adjacent keyways is made to correspond to the distance between any two buttonholes to be fabricated.

At the rear portion of the work supporting base 12 and intermediate two keyways 15, 15 is an extension 16 having two integral vertical guide members 17 which are positioned in spaced-apart relation and form a guideway 18 therebetween.

It is to be noted that the wall 13 has a cutout portion or passageway 19 which is slightly wider than the guideway 18. It is also to be noted that the guide members 17 are positioned in right-angular relation with the wall 13.

Slidably mounted in the guideway 18 and passing freely through the guideway 19 is an elongated cloth raising member 20. Slidably mounted on the member 20 is an elongated hold down member 21.

The cloth raising slide member 20 has a slot 22 permitting passage therethrough of the elongated section 11 while the hold down slide member 21 has a slot 23 permitting passage therethrough of a cutting member 25 shown in Figures 5 to 11 inclusive.

As best shown in Figure 3, a cloth holding and clamping gauge 30 is mounted on the work supporting base 12 and comprises upper and lower plates 31, 32, between which a section of cloth 33 is suitably secured for fabricating plastic buttonholes therein.

The upper plate 31 has a plurality of openings 34 adjacent its rear face, which are equally spaced-apart a pre-determined distance as determined by the distance between any two buttonholes to be made in the section of cloth 33.

The lower plate 32 has two front extensions 35 on which two spring arms 36 are pivotally mounted on pins 37 to swing on or away from the plate 31.

As best shown in Figure 4, a plate 39 is hingedly mounted in relation to the plate 32 on a pintle 40. The device comprises two spring arms 36 and two plates 39.

In operation, the spring arms 36 are swung away from the plates 39 to permit swinging the plates 39 forwardly, when the operator may move the upper plate 31 away from the lower plate 32 and place the cloth in position on the plate 32. The plate 31 is then moved into contact with the cloth 33 and the plates 39 and the spring arms 36 are swung into operating position to clamp the cloth for fabricating buttonholes therein.

It is to be noted that the rear edge of the cloth 33 is placed in alinement with the rear edge of the top plate 31 so that the clamping gauge 30 may be moved step-by-step to the right, as indicated by arrows in Figure 3 and as determined by engagement of keys 24 in the plate 31 with the keyways 15.

The successive operations that take place in the opening 34 in line with the slide members 20 and 21 is shown in the succeeding figures and is as follows:

Figure 5 is a cross-sectional view of a fragmentary portion of the molding press, the section being taken as on line 5—5 in Figure 3 and shows the upper and lower clamping plates 31, 32 and a layer of cloth 33 therebetween and mounted on the base 12. This figure also shows the plastic tubular section 11 mounted by the operator on the cloth cutting member 25.

It is to be noted that the cloth 33 is shown in raised position above the base 12 prior to the slitting operation and that one of the keys 24 of the top plate 31 is shown in engagement with a keyway 15 in the guide wall 13.

The shank portion 26 of the cutting member 25 is shown secured by a bolt 27 in a vertical plunger or housing 28 of the molding press. The base 12 has an elongated through slot 29, the upper portion of which permits close contact with the cutting member 25.

Figure 6 is a view similar to that shown in Figure 5, showing the cutting member 25 lowered in operative cutting position in the cloth 33. It is to be noted that a portion of the cloth at the cutting position is lowered into contact with the base 12.

Figure 7 is a view similar to that shown in Figure 6, showing the cloth raising member 20 moved horizontally forwardly around the slit portion of the cloth whereby the cloth is raised a pre-determined distance above the base 12 and into contact with the lower face of the plastic tubular section 11.

Referring to Figure 3, it will be seen that the raising member 20 is bifurcated and that in the forward position shown in Figure 7, one of the forks 45 of the member 20 conceals a portion of the cutting member 25.

Figure 8 is a view similar to Figure 7, and showing the tubular section 11 moved down and inserted into the cloth 33 so that it projects equally from the upper and lower faces of the cloth.

Figure 9 is a view similar to Figure 8, and showing the hold down member 21 moved horizontally on top of and in contact with the upper face of the tubular section 11.

Figure 10 is a view similar to Figure 9 and showing the cutting member 25 moved upwardly clear of the tubular section 11.

Figure 11 is a view similar to Figure 10 and showing the hold down member 21 and the cloth raising member 20 moved horizontally away from and clear of the tubular section 11.

Figure 12 is a top plan view of a fragmentary portion of the work supporting base 12 of the molding press with the tubular section 11 inserted in the cloth 33 and ready for molding flanges at the top and bottom surfaces of the section.

It is to be noted that after the operation shown in Figure 11 is completed, the clamping plates 31 and 32 with the slitted cloth 33 and with the inserted tubular section 11 is moved to the molding position shown in Figures 3, 13, and 14.

Figure 13 is a view of a fragmentary portion of the molding section 50 of the molding press. The molding section 50 comprises a hollow upper molding die 51 having therein an electric heating element 52 and lead wires 53, well known in the art. At the lower surface of the upper molding die 51 is an elongated flanging member 54 which is thin enough in width so as to enter into the opening 55 in the section 11 shown in Figure 12.

It is to be noted that the openings 34 in the upper clamping plate 31 permit the cutting member 25 and the upper molding die 51 to pass therethrough to the cloth 33.

The molding section 50 also comprises a hollow lower molding die 56 having an electric heating element 52 and lead wires 53. At the upper surface of the lower molding die 56 is an elongated flanging member 54' of the same size as the flanging member 54.

As shown in Figure 14, under operating conditions the molding dies 51 and 56 are heated to a temperature to cause the heat-softenable plastic material of the section 11 to become tacky when in contact with the dies. The upper molding die 51 is moved down under pressure against the lower molding die and the flanging members 54, 54' forcibly enter the tubular section 11 and spread the upper and lower edge portions of the section in a horizontal direction and form flanges 57 on the section 11 and a finished flexible plastic buttonhole 58 (Figure 15) in the fabric 33. It is to be noted that the product shown in Figure 15 is a finished flexible plastic buttonhole or a postformed-flexible plastic buttonhole.

This application discloses a method of fabricating the buttonholes disclosed in my prior patent application, Serial No. 662,275, filed April 15, 1946, now abandoned.

The mechanism herein disclosed diagrammatically has been designed specially for carrying out the steps of the method hereinafter claimed for producing flexible plastic buttonholes from pre-determined lengths of tubular sections of molded material. The molding machine for carrying out the above method contains mechanical equivalents of the mechanism shown herewith and forms the subject matter of a copending patent application.

It is to be noted that the completed buttonhole is formed without any stitching extending therethrough and without any external binding agent.

In accordance with the patent statutes I have described and illustrated the preferred embodiment of my invention, but it will be understood that various changes and modifications can be made therein without departing from the spirit of the invention as defined by the appended claims.

I claim:

1. The method of fabricating postformed-flexible plastic buttonholes spaced-apart equally and laterally in a section of fabric and in spaced-apart relation from an edge portion of said fabric, which comprises clamping said section of fabric between upper and lower plates of a clamping gauge slidably mounted on a base, mounting a tubular section of flexible thermoplastic resinous material on a laterally elongated cutter, cutting an aperture in said fabric by said cutter and simultaneously inserting said tubular section in said aperture by said cutter, in causing an equal piece of said tubular section to project from said fabric on opposite sides of said fabric, in deforming the top and bottom of said tubular section by upper and lower flanging dies to form upper and lower flanges, and in applying heat and pressure to the flanges to cause the plastic material to be impregnated into the fabric from opposite sides while tacky, and in successively passing said aperture cutting means and said molding means through apertures in said upper plate to said clamped section of fabric to form said plastic buttonholes in succession.

2. In apparatus for fabricating plastic buttonholes spaced-apart equally in a section of fabric and in spaced-apart relation from an edge portion of said fabric, a base having an upright guide wall with spaced-apart keyways, a clamping gauge slidably mounted on said base and having upper and lower clamping plates, means for clamping a section of fabric between said plates, said plates having keys engageable with said keyways, said upper plate having a plurality of openings adjacent its rear face and spaced-apart to correspond to buttonhole spacing, a laterally elongated cutter of rectangular cross-section vertically movably mounted and having space above its cutting edge for supporting a tubular section and adapted for cutting an aperture in said fabric and simultaneously inserting said tubular section in said aperture in a manner as to cause said tubular section to project from said fabric on opposite sides, means for holding down said tubular section to permit withdrawal of said cutter while said tubular section remains in said fabric, means for forming flanges at the top and bottom of said tubular section by upper and lower flanging dies, and means for successively passing said aperture cutting means through apertures in said upper plate into said clamped section of fabric as defined by said key and keyway spacings to form said plastic buttonholes in succession.

ISRAEL BOTWINICK.

REFERENCES CITED

The following references are of record in the file of this patent:

UNITED STATES PATENTS

| Number | Name | Date |
|---|---|---|
| 586,770 | Kempshall | July 20, 1897 |
| 903,778 | Richards | Nov. 10, 1908 |
| 1,122,280 | Kempshall | Dec. 29, 1914 |
| 1,211,438 | Hagelstein | Jan. 9, 1917 |
| 1,616,752 | MacDonald | Feb. 8, 1927 |
| 2,319,307 | Eddy | May 18, 1943 |
| 2,366,274 | Luth et al. | Jan. 2, 1945 |
| 2,392,734 | Haberstump | Jan. 8, 1946 |
| 2,429,015 | Contrastano | Oct. 14, 1947 |